(12) United States Patent
Takahashi et al.

(10) Patent No.: US 7,712,672 B2
(45) Date of Patent: May 11, 2010

(54) ANTENNA MODULE AND PORTABLE COMMUNICATION TERMINAL EQUIPPED WITH THE ANTENNA MODULE

(75) Inventors: Isao Takahashi, Miyagi (JP); Hiraku Akiho, Miyagi (JP)

(73) Assignee: Sony Corporation, Tokyo (JP)

( * ) Notice: Subject to any disclaimer, the term of this patent is extended or adjusted under 35 U.S.C. 154(b) by 36 days.

(21) Appl. No.: 10/559,325

(22) PCT Filed: Jun. 4, 2004

(86) PCT No.: PCT/JP2004/008172

§ 371 (c)(1),
(2), (4) Date: Dec. 2, 2005

(87) PCT Pub. No.: WO2004/109852

PCT Pub. Date: Dec. 16, 2004

(65) Prior Publication Data

US 2007/0095913 A1 May 3, 2007

(30) Foreign Application Priority Data

Jun. 6, 2003 (JP) ............................. 2003-163055

(51) Int. Cl.
*G06K 19/06* (2006.01)
(52) U.S. Cl. .................. 235/492; 343/725; 343/728; 343/788; 343/866; 343/867; 343/894
(58) Field of Classification Search .......... 235/439, 235/451, 492, 462.46, 472.02; 343/742, 343/787, 788, 841, 847, 865, 895, 725, 728, 343/866, 867, 894; 340/10.1, 572.1–572.7
See application file for complete search history.

(56) References Cited

U.S. PATENT DOCUMENTS

| 4,717,990 A * | 1/1988 | Tugcu ..................... 361/816 |
| 5,539,148 A * | 7/1996 | Konishi et al. ............ 174/391 |
| 5,574,470 A * | 11/1996 | de Vall ..................... 343/895 |
| 6,215,455 B1 * | 4/2001 | Lamata D'Angelo et al. ......................... 343/842 |
| 6,665,536 B1 * | 12/2003 | Mahany .................. 455/432.1 |
| 6,774,865 B1 * | 8/2004 | Serra ....................... 343/895 |
| 7,000,837 B2 * | 2/2006 | Akiho et al. ............... 235/451 |

(Continued)

FOREIGN PATENT DOCUMENTS

JP          10-197662          7/1998

(Continued)

*Primary Examiner*—Daniel A Hess
*Assistant Examiner*—Rafferty Kelly
(74) *Attorney, Agent, or Firm*—Sonnenschein Nath & Rosenthal LLP

(57) ABSTRACT

An antenna module and a portable communication terminal equipped with the antenna module are provided. The antenna module has a space-saving design, and also has both a capability for long communication distance for a tag function and a capability for wide communication range for a reader/writer function.

A first antenna coil (11) for communication with a reader/writer and a second antenna coil (12) for communication with an IC tag are disposed on a base substrate (10). The first antenna coil (11) is disposed in an outermost periphery section of the base substrate (10) so that a communication distance is attained. The second antenna coil (12) is disposed within an inner periphery of the first antenna coil (11) so as to achieve overall size reduction of the module.

17 Claims, 10 Drawing Sheets

U.S. PATENT DOCUMENTS

| | | |
|---|---|---|
| 2003/0107025 A1* | 6/2003 | Okayama et al. .............. 252/500 |
| 2003/0141590 A1* | 7/2003 | Kamiya et al. ............... 257/730 |
| 2004/0201522 A1* | 10/2004 | Forster ................. 343/700 MS |
| 2007/0069858 A1* | 3/2007 | Kubo ........................ 340/10.1 |

FOREIGN PATENT DOCUMENTS

| | | |
|---|---|---|
| JP | 11-98061 | 4/1999 |
| JP | 2001-24425 | 1/2001 |
| JP | 2001-92942 | 4/2001 |
| JP | 2001-188889 | 7/2001 |
| JP | 2003-44810 | 2/2003 |
| JP | 2003-150916 | 5/2003 |
| WO | WO 99/26197 * | 5/1999 |
| WO | WO 03/030300 A1 * | 4/2003 |

* cited by examiner

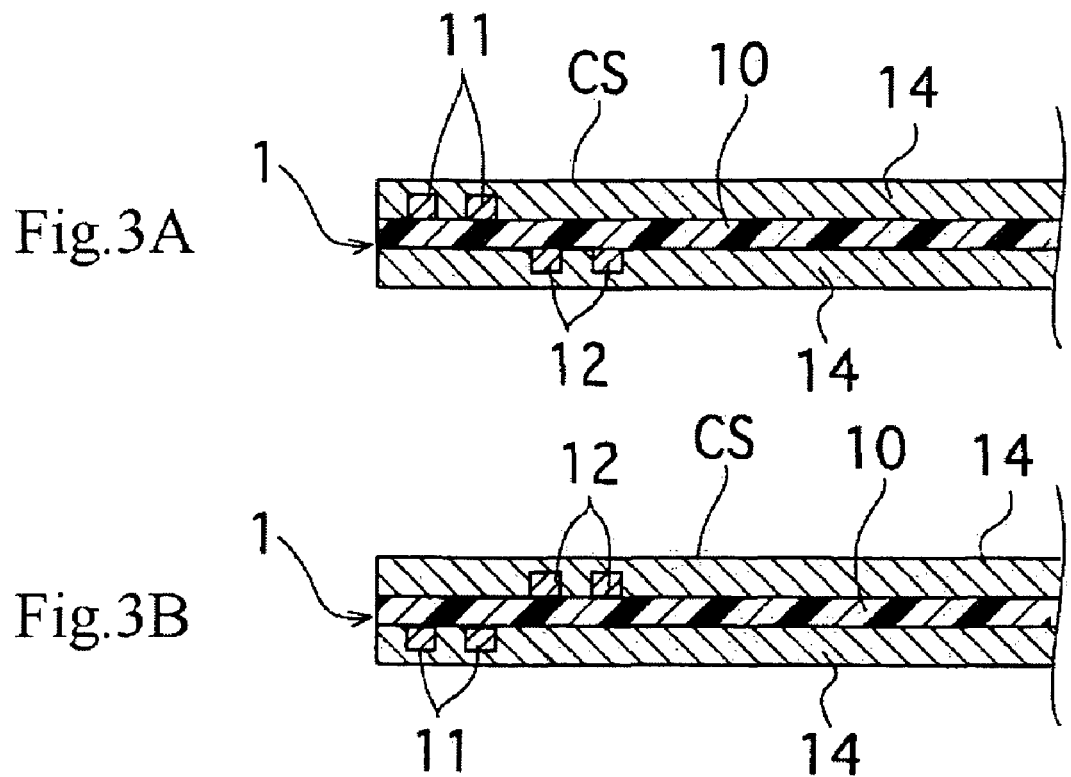
Fig.3A
Fig.3B
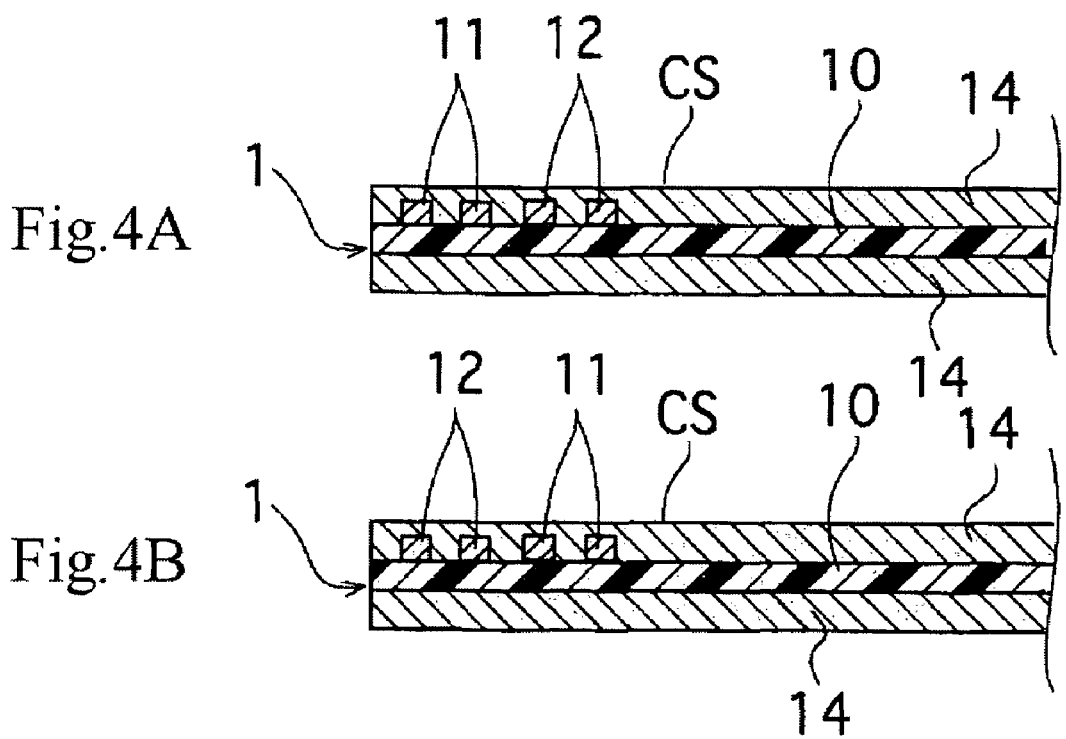
Fig.4A
Fig.4B

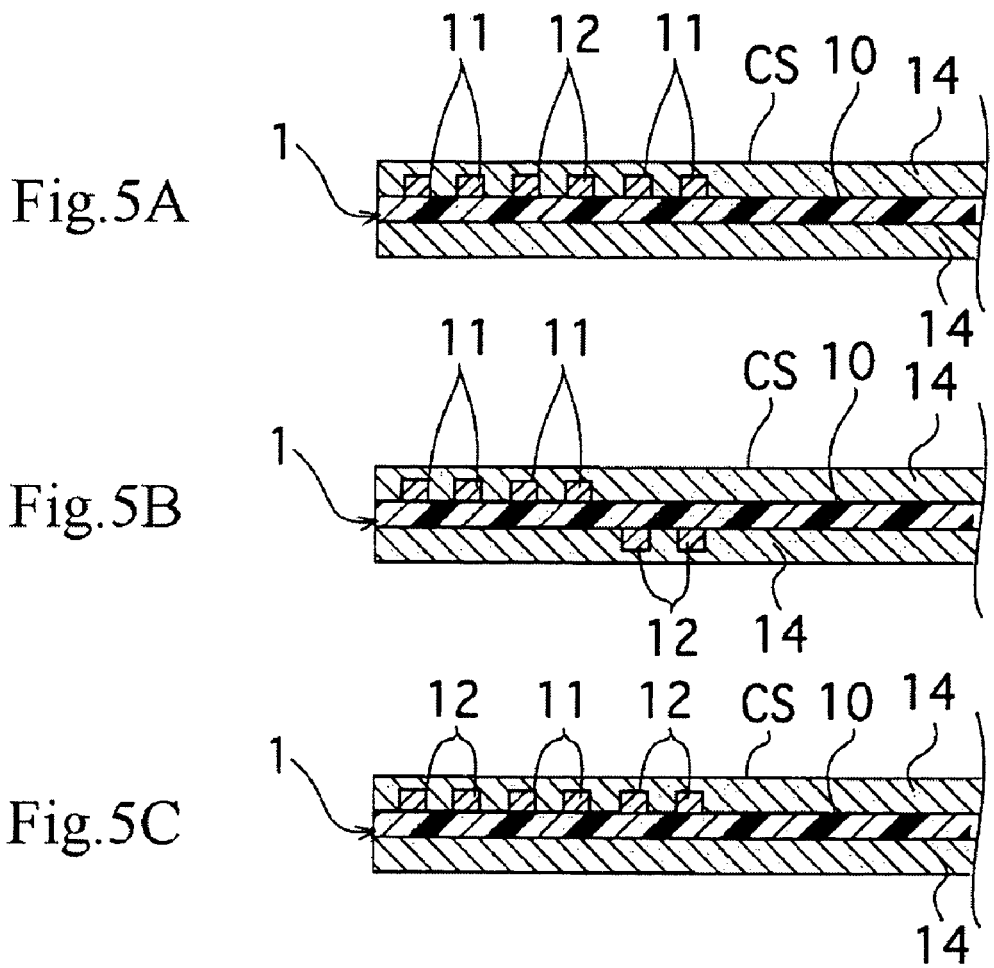
Fig.5A
Fig.5B
Fig.5C
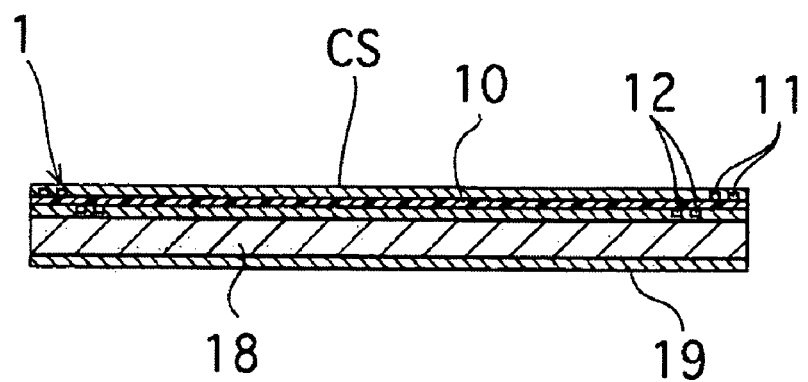
Fig.6

ANTENNA MODULE AND PORTABLE COMMUNICATION TERMINAL EQUIPPED WITH THE ANTENNA MODULE

TECHNICAL FIELD

The present invention relates to an antenna module used for an RFID (radio frequency identification) system, and to a portable communication terminal equipped with such an antenna module.

BACKGROUND ART

Conventionally, in RFID technology typically known for a contact-free IC card system, an antenna coil is built in an identification IC tag, such as an IC card, and forms inductive coupling with an electric wave released from a transmitter-receiver antenna of a reader/writer, such that data communication is performed.

Currently, a mode for performing data communication between an IC tag and a reader/writer is applied to, for example, making payments for train fares using an IC card. In such an example, when checking the usage of an IC card, a ticket-vending machine set in a train station or a specific viewer for reading data in the IC card is necessary. Moreover, in order to bill the IC card, the IC card must be billed (by cyber billing) on the Internet via, for example, a ticket-vending machine in a train station or a personal computer equipped with a reader/writer.

Such a mode for performing data communication between an IC tag and a reader/writer is expected to become more diversified in years to come. For example, in order to further increase the level of convenience, portable communication terminals, such as mobile phones and PDAs (personal digital assistants), will assumably be equipped with a tag function and a reader/writer function.

For example, by providing a mobile phone with a tag function, the mobile phone can be used to pay train fares by holding the phone up against the ticket gate. Furthermore, cyber billing can be achieved by using the communication function of the mobile phone. In addition, the outstanding balance in the tag included in the terminal can be checked by using the display function of the mobile phone.

Furthermore, by providing a mobile phone with a reader/writer function, the mobile phone can function alternatively as a ticket-vending machine in a train station. For example, this allows for checking of information related with the outstanding balance of other IC tags (IC cards), and also enables cyber billing.

As described above, if a mobile phone, for example, is equipped with both a tag function and a reader/writer function, a terminal body must carry designated antenna modules respectively for the tag function and the reader/writer function. In other words, when using the mobile phone as a tag, an antenna module used for communication with an external reader/writer is required. On the other hand, when using the mobile phone as a reader/writer, an antenna module used for communication with an external IC tag (IC card) is required.

Specifically, in recent RFID systems that operate at a frequency of 13.56 MHz, a proper operating environment is required. For example, with regard to communication properties, a longer communication distance is desired, or if the reader/writer and the IC tag are opposed to each other, a wide planar communication range is desired.

Generally, an important capability for an IC tag is communication distance, whereas an important capability for a reader/writer is communication range rather than communication distance. The communication property of an antenna module required for a tag function differs from the communication property of an antenna module required for a reader/writer function. Since these antenna modules require different antenna configurations, it is substantially impossible to satisfy the two functions with a single antenna coil.

Patent Document 1 (Japanese Unexamined Patent Application Publication No. 8-194785) discloses a technology related with an improved reader/writer antenna coil for increasing the communication distance between an IC card and a reader/writer. Patent Document 2 (Japanese Unexamined Patent Application Publication No. 11-66260) discloses an IC card equipped with an antenna coil having an improved data transmitting efficiency. Patent Document 3 (Japanese Unexamined Patent Application Publication No. 2002-15288) discloses a reader/writer that is capable of performing multi-communication with a plurality of different transponders (IC tags). Furthermore, Patent Document 4 (Japanese Unexamined Patent Application Publication No. 2002-325013) discloses an antenna module that prevents the communication properties from deteriorating, which may be caused by mutual interference with an attaching object.

On the other hand, in the field of electronic devices typically known for portable communication terminals, a light-weight, thin, compact structure is in great demand. This is achieved by, for example, size reduction, high-density packaging, and high integration of electronic components. Consequently, there is substantially no free space remaining for an addition of a new module for adding a new function. For this reason, incorporating the two above-mentioned types of antenna modules and a signal processing circuit thereof (RFID circuit) into the portable communication terminal automatically leads to a large dimension of the terminal body.

On the other hand, it is possible to inhibit the terminal body from becoming large in size by reducing the dimension of each antenna module. In that case, however, the communication properties are inevitably subject to deterioration. This is due to the fact that each antenna requires a certain surface area or more in order to satisfy the desired communication properties (communication distance, communication range, etc.).

In view of the circumstances described above, it is an object of the present invention to provide an antenna module that achieves a space-saving design as well as having both a capability for long communication distance for a tag function and a capability for wide communication range for a reader/writer function, and to provide a portable communication terminal equipped with such an antenna module.

DISCLOSURE OF INVENTION

In order to achieve the above-mentioned object, the present invention provides an antenna module which includes a common substrate; a first antenna coil disposed on the common substrate and provided for communication with a reader/writer; and a second antenna coil disposed on the common substrate and provided for communication with an IC tag. Accordingly, a space-saving antenna module having both a long communication distance required for a tag function and a wide communication range required for a reader/writer function is provided.

In order to further contribute to a space-saving design of the antenna module, each of the first and second antenna coils is preferably an air core coil (loop coil) wound in a spiral manner within a plane of the substrate, and one of antenna coils is preferably disposed within an inner periphery of the other antenna coil. Thus, the antenna module can be given the same dimension as the occupied area by the first antenna coil requiring a long communication distance and provided for communication with the reader/writer.

Furthermore, the present invention provides another antenna module which includes a common substrate; a first antenna coil disposed on the common substrate and provided for communication with a reader/writer; a second antenna coil disposed on the common substrate and provided for communication with an IC tag; and a signal processing circuit disposed on the common substrate and including an IC storage medium storing data to be transmitted via the first and second antenna coils. According to this structure, the space-saving design of the antenna module is further improved.

In order to further contribute to the space-saving design of the antenna module, each of the first and second antenna coils is preferably an air core coil wound in a spiral manner within a plane of the substrate. Moreover, one of antenna coils is preferably disposed within an inner periphery of the other antenna coil, and the signal processing circuit is preferably disposed within the inner periphery of the other antenna coil.

Furthermore, the present invention provides a portable communication terminal having a function for data communication via communication network. The portable communication terminal includes an antenna module including a common substrate on which a first antenna coil for communication with a reader/writer and a second antenna coil for communication with an IC tag are disposed; and an IC storage medium storing data to be transmitted via the first and second antenna coils.

Accordingly, a portable communication terminal having both a tag function and a reader/writer function is achieved. For example, the tag function of the terminal can be used for paying train fares, and the reader/writer function of the terminal can be used to check information, such as the outstanding balance in the IC tag.

Furthermore, since the first antenna coil for communication with a reader-writer and the second antenna coil for communication with an IC tag are included in a single antenna module, a space-saving design of the antenna module is achieved, thereby preventing the terminal body from having a large size.

BRIEF DESCRIPTION OF THE DRAWINGS

FIGS. 3A and 3B are enlarged cross-sectional views illustrating examples of a positional relationship between a first antenna coil 11 and a second antenna coil 12 of the antenna module 1.

FIGS. 4A and 4B are enlarged cross-sectional views illustrating examples of a positional relationship between the first antenna coil 11 and the second antenna coil 12 of the antenna module 1.

FIGS. 5A to 5C are enlarged cross-sectional views illustrating examples of a positional relationship between the first antenna coil 11 and the second antenna coil 12 of the antenna module 1.

FIG. 6 is a cross-sectional view illustrating a unitized state in which a magnetic sheet 18 and a metallic plate 19 are bonded to the antenna module 1.

BEST MODE FOR CARRYING OUT THE INVENTION

Embodiments of the present invention will now be described with reference to the drawings.

First Embodiment

Figure 1:
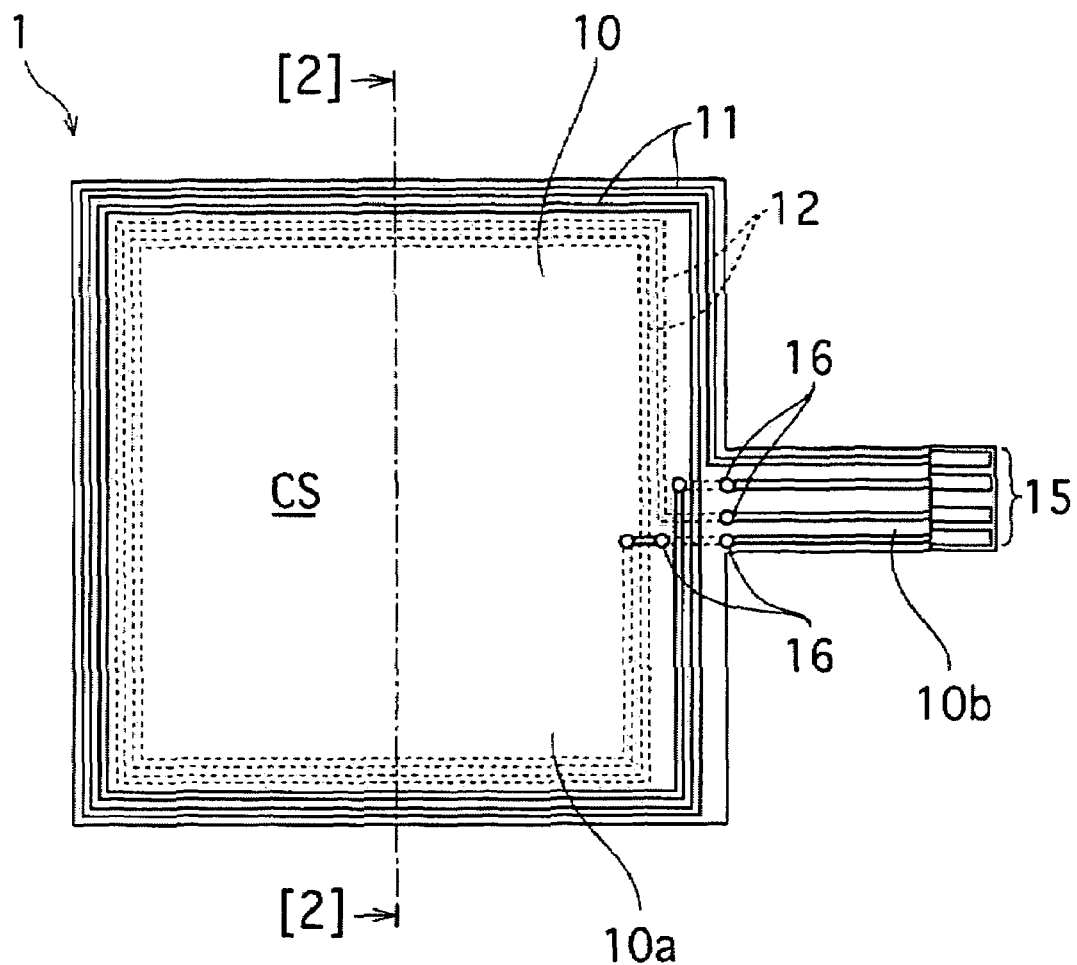
FIG. 1 is a plan view of an antenna module 1 according to a first embodiment of the present invention.
Figure 2:
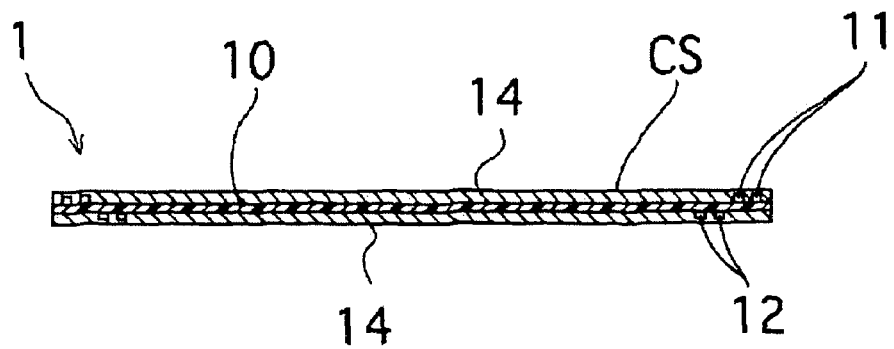
FIG. 2 is a cross-sectional view taken along line [2]-[2] in FIG. 1.

FIGS. 1 and 2 illustrate an antenna module 1 according to a first embodiment of the present invention. Specifically, FIG. 1 is a plan view of the antenna module 1, and FIG. 2 is a cross-sectional view taken along line [2]-[2] in FIG. 1.

The antenna module 1 according to the first embodiment includes a common base substrate 10 on which a first antenna coil 11 for communication with a reader/writer and a second antenna coil 12 for communication with an IC tag are disposed.

The second antenna coil 12 indicated by a dashed line in the drawing is disposed on the bottom surface (underside of the drawing) of the base substrate 10. This will be described in detail below.

The base substrate 10 is composed of an insulating material. The base substrate 10 may be formed of a material having rigidity (self-supporting capability), such as a glass epoxy substrate, or may be formed of a flexible material, such as polyimide, PET, and PEN.

The base substrate 10 includes a coil holding section 10a having a large surface area in which the first antenna coil 11 and the second antenna coil 12 are disposed; and a connecting section 10b having a small surface area in which an external-terminal connecting portion 15 electrically connected to ends of the first and second antenna coils 11, 12 is disposed. The external-terminal connecting portion 15 is connected to a terminal of an IC chip, not shown, or to a terminal on a printed circuit board having an IC chip mounted thereon.

In FIG. 1, reference numeral 16 indicates through holes for electrically connecting the top and bottom surfaces of the base substrate 10. The first and second antenna coils 11, 12 are connected to predetermined positions in the external-terminal connecting portion 15 via the through holes 16. The top and bottom surfaces of the base substrate 10 are each provided with an over-coating member 14 composed of an insulating material.

The first antenna coil 11 and the second antenna coil 12 are composed of a conductive material, which may be a thin metal film of, for example, aluminum or copper, or a printed body of a conductive paste. The width and the length of each antenna coil and the film thickness or the coating thickness for each antenna coil are set in accordance with the desired communication performance.

Each of the first and second antenna coils 11, 12 is a an air core coil (loop coil) wound in a spiral manner within a plane of the base substrate 10. Although the positional relationship between the first antenna coil 11 and the second antenna coil 12 is not specifically limited, the second antenna coil 12 is disposed within the inner periphery of the first antenna coil 11 in the first embodiment.

According to this configuration, a large area can be attained for the first antenna coil 11, thereby improving a tag function generally requiring a sufficient communication distance. Furthermore, since the antenna module 1 is given a dimension that is substantially equal to the occupied area by the first antenna coil 11, the antenna module 1 can be made smaller in size in comparison to a case where the first and second antenna coils 11, 12 are arranged in parallel.

Although the first antenna coil 11 is disposed around the outer periphery of the second antenna coil 12 (see FIG. 3A), the second antenna coil 12 may alternatively be disposed around the outer periphery of the first antenna coil 11 (see FIG. 4B) if the desired communication performance is different.

The antenna configuration of the first antenna coil 11 and the second antenna coil 12 may be set in accordance with the desired communication performance, and may take other shapes, such as a circular shape, instead of the rectangular shape shown in the drawing. Furthermore, although each of the antenna coils 11, 12 is wound twice in the drawings, the number of windings may be set in accordance with the specification.

The first antenna coil 11 and the second antenna coil 12 are separated from each other by a distance that prevents the two from being magnetically coupled to each other. In other words, the distance is set to an extent that the two antenna coils are prevented from disturbing each other's communication properties.

Figure 9:
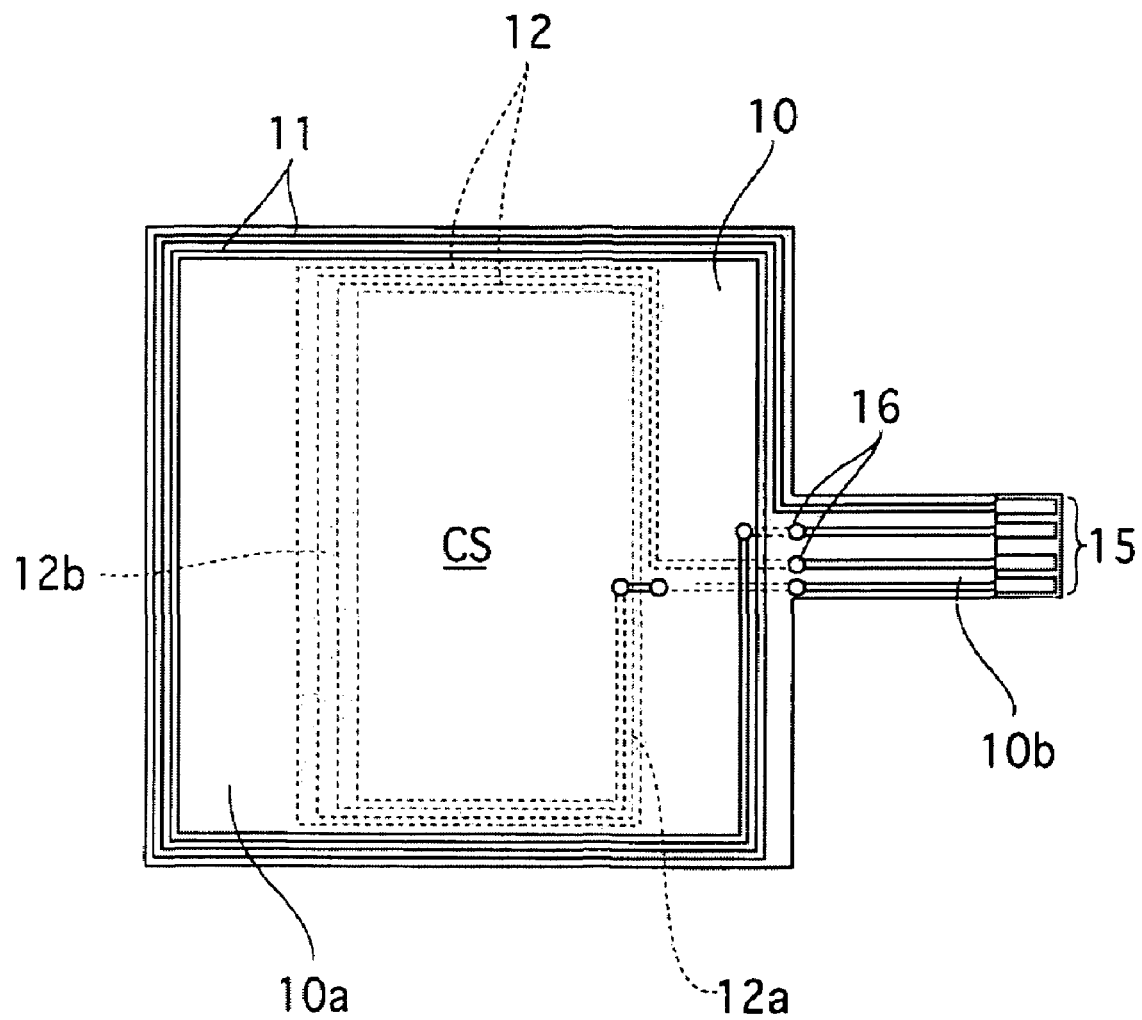
FIG. 9 is a plan view illustrating a modification example of a second antenna coil 12A of the antenna module 1.

FIG. 9 illustrates a modification example of the second antenna coil 12. In the drawing, a second antenna coil 12A indicated by a dashed line is disposed on the bottom surface (underside of the drawing) of the base substrate 10.

The second antenna coil 12A shown in the drawing has a structure in which coil portions on opposite sides of the central region of the second antenna coil 12A are asymmetrical to each other. With respect to one direction, the windings in one coil portion are arranged at a pitch that is different from that of the windings in the other coil portion, and moreover, the windings in the one coil portion have a line width that is different from that of the windings in the other coil portion. In other words, with respect to one direction (i.e. the horizontal direction in FIG. 9), the second antenna coil 12 has a right portion 12a in which the pitch and the line width of the windings are narrow, and a left portion 12b in which the pitch and the line width of the windings are wide.

In this case, the magnetic distribution by the second antenna coil 12A is different from a symmetrical magnetic distribution by the first antenna coil 11 in which the pitch and the line width of the windings are symmetrical. In detail, the magnetic distribution by the second antenna coil 12A is asymmetrical such that the magnetic distribution is emphasized in the left portion 12b in which the pitch and the line width of the windings are wide.

Accordingly, by giving the second antenna coil 12A the structure shown in the drawing, the communication range with an IC tag (IC card) can be made larger, and moreover, the communicable position can be shifted in one direction. Furthermore, since the second antenna coil 12A can be made smaller in size than the antenna coil on the IC tag side, the communication performance is prevented from deterioration even if the second antenna coil 12A is disposed within the inner periphery of the first antenna coil 11.

The first antenna coil 11 is disposed on a side of a communication surface CS of the antenna module 1 (i.e. the top surface of the base substrate 10), whereas the second antenna coil 12 is disposed on the opposite side (i.e. the bottom surface of the base substrate 10) of the communication surface CS of the antenna module 1 (FIG. 2, FIG. 3A). Accordingly, this improves the tag function requiring a sufficient communication distance.

Alternatively, if the desired communication performance is different (for example, if a certain communication distance or more is also required for the reader/writer function), the second antenna coil 12 may be disposed on the side of the communication surface CS of the antenna module 1 (FIG. 3B, FIG. 4A, FIG. 4B). In that case, the first antenna coil 11 may be disposed on the opposite side of the communication surface CS of the antenna module 1 (FIG. 3B), or may be disposed on the side of the communication surface CS of the antenna module 1 together with the second antenna coil 12 (FIG. 4A, FIG. 4B).

As shown in FIGS. 4A and 4B, the positional relationship between the antenna coils 11, 12 is flexible. Whether the antenna coils 11, 12 are positioned on the outer periphery side or the inner periphery side is determined based on the desired communication performance.

Furthermore, the first antenna coil 11 and the second antenna coil 12 disposed on the opposite surfaces of the base substrate 10 must not overlap each other in order to prevent the two from being magnetically coupled to each other.

On the other hand, the first antenna coil 11 and/or the second antenna coil 12 disposed on the base substrate 10 is/are not limited to one type. In other words, multiple types of first and second antenna coils 11, 12 may be provided so as to communicable with IC tags or reader/writers of multiple types having different communication specifications by using the same antenna module 1.

For example, FIG. 5A illustrates an example in which a total of two types of first antenna coils 11 are respectively disposed in the outer periphery section and the inner periphery section of the top surface of the base substrate 10. Moreover, the two types of first antenna coils 11 have one type of second antenna coil 12 disposed therebetween. FIG. 5B illustrates an example in which a total of two types of first antenna coils 11 are disposed on the top surface of the base substrate 10, and one type of second antenna coil 12 is disposed on the bottom surface of the base substrate 10. Furthermore, FIG. 5C illustrates an example in which a total of two types of second antenna coils 12 are respectively disposed in the outer periphery section and the inner periphery section of the top surface of the base substrate 10. Moreover, the two types of second antenna coil 12 have one type of first antenna coil 11 disposed therebetween.

As described above, the antenna module 1 according to the first embodiment includes the common base substrate 10 on which the first antenna coil 11 for communication with a reader/writer and the second antenna coil 12 for communication with an IC tag are disposed. Thus, a tag function and a reader/writer function are provided in a single antenna module 1. Accordingly, this sufficiently contributes to a space-saving design as well as achieving the communication performance required for both a tag function and a reader/writer function.

Figure 7:
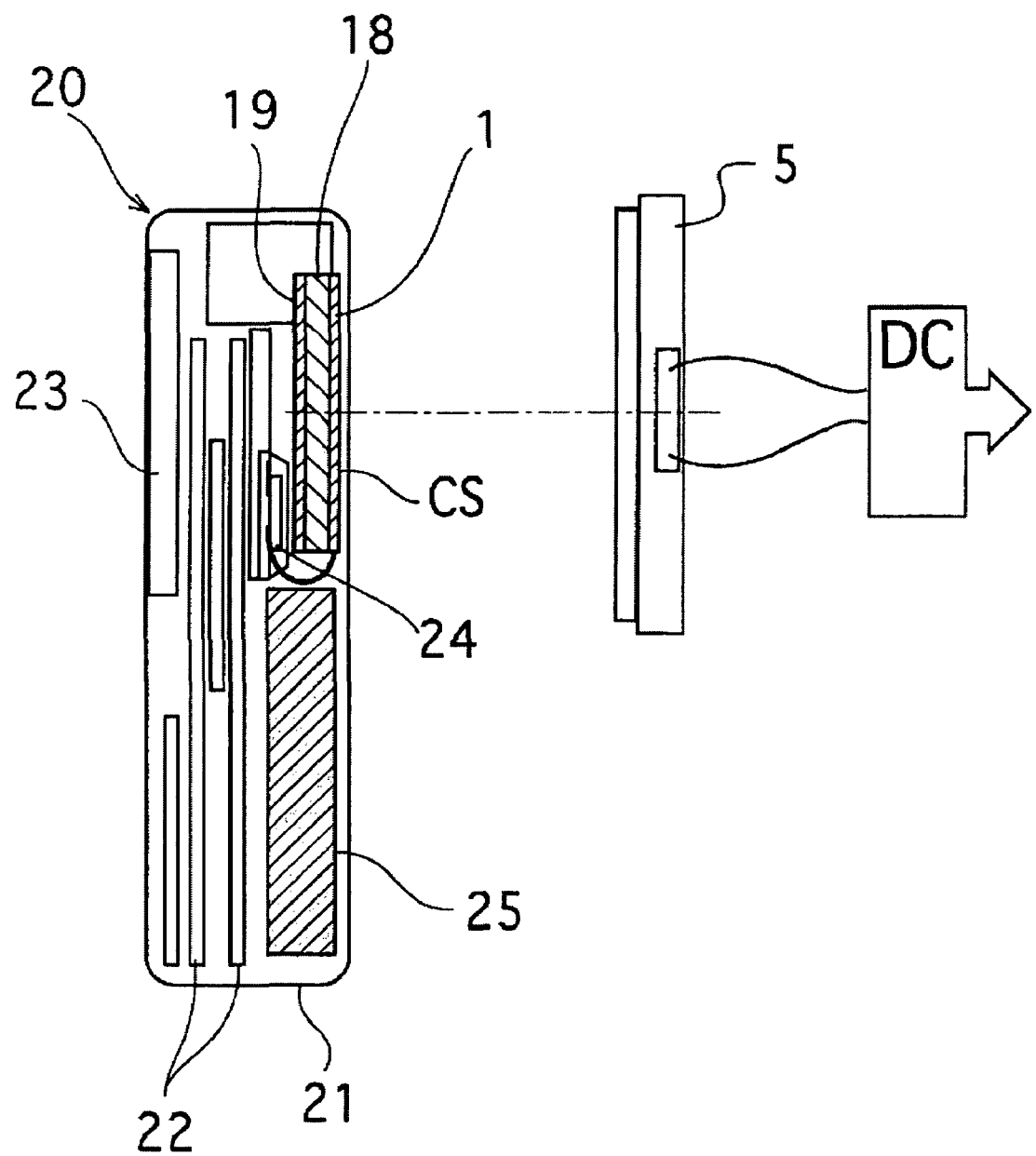
FIG. 7 is a schematic diagram illustrating the structure and one operational example of a portable communication terminal 20 containing the antenna module 1.
Figure 8:
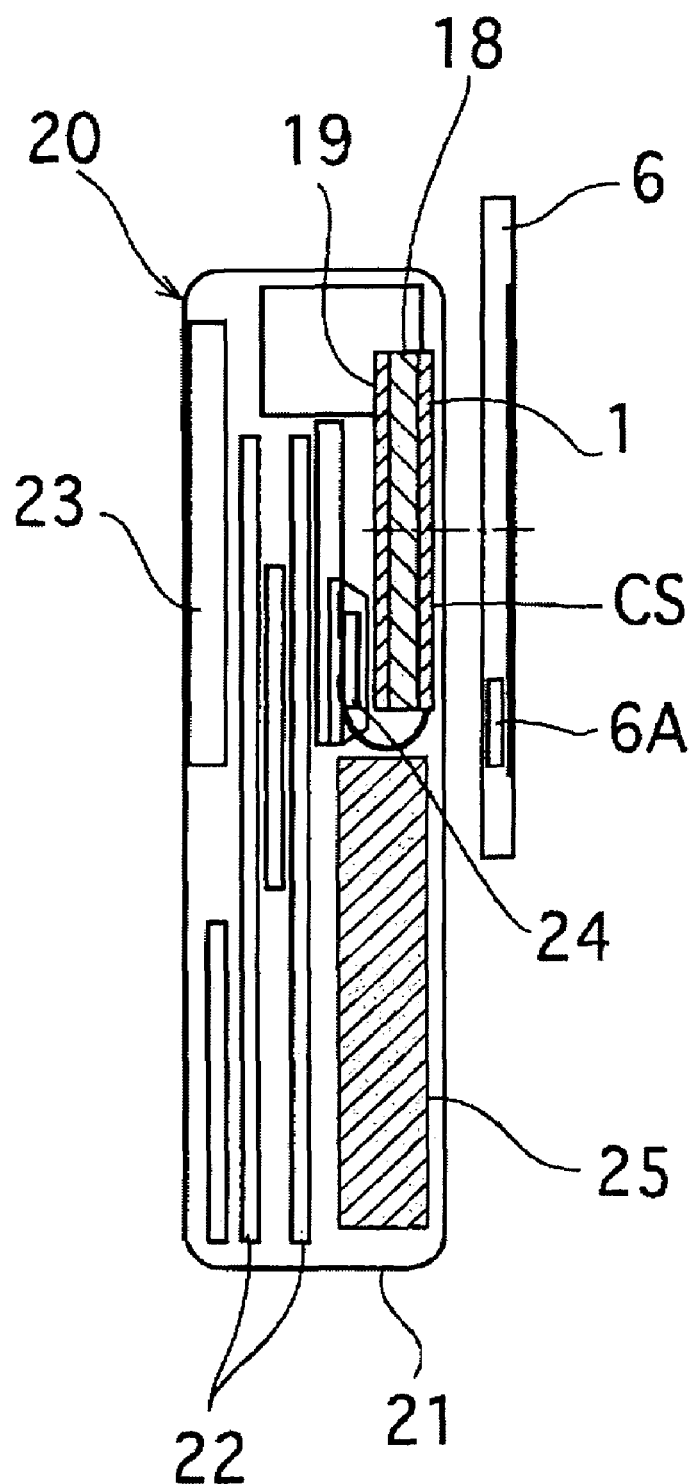
FIG. 8 is a schematic diagram illustrating the structure and another operational example of the portable communication terminal 20 containing the antenna module 1.

FIGS. 7 and 8 are schematic cross-sectional views of a portable communication terminal 20 equipped with the antenna module 1. In the drawings, the antenna module 1 is disposed inside a terminal body 21 of the portable communication terminal 20 at an upper section on the rear surface of the terminal body 21.

The terminal body 21 contains an electronic circuit board 22 and a battery 25. The electronic circuit board 22 holds a CPU and other electronic components for controlling various functions of the portable communication terminal 20 having a function for data communication via communication network. One surface of the terminal body 21 is provided with a display portion 23, which may be, for example, a liquid-crystal display. Furthermore, although not shown in the drawing, the terminal body 21 further contains, for example, communication means including a transmitter-receiver antenna required for sending and receiving data via the communication network; an operating input portion; and a microphone and a speaker required for a telephone function.

The antenna module 1 and an attachment portion of the terminal body 21 have a magnetic sheet 18 and a metallic plate 19 disposed therebetween in that order from the antenna module 1. In the first embodiment, as shown in FIG. 6, the non-conductive magnetic sheet 18 and the metallic plate 19 are bonded to a main surface of the antenna module 1, which is opposite to the communication surface CS, such that the antenna module 1, the magnetic sheet 18, and the metallic plate 19 are unitized.

The magnetic sheet 18 is formed by, for example, mixing sendust (Fe—Al—Si) powder with a synthetic resin material and then forming the mixture into a sheet. Alternatively, the magnetic powder may be a soft magnetic material, such as permalloy (Fe—Ni), amorphous (Fe—Si—Al—B), ferrite (for example, Ni—Zn ferrite, Mn—Zn ferrite), and sintered ferrite. These types of magnetic powder may be used selectively in accordance with the desired communication performance or the intended purpose.

Since the magnetic sheet 18 is disposed between the antenna module 1 and the metallic plate 19, the deterioration of the communication performance caused by electromagnetic interference between the antenna module 1 and the metallic plate 19 can be prevented. Moreover, this configuration is also advantageous in that the distance between the antenna module 1 and the metallic plate 19 is small.

On the other hand, the metallic plate 19 functions as a shielding plate, and is provided for separating the communication operation of the portable communication terminal 20 from the communication operation of the antenna module 1. Thus, a malfunction or other functional problems in the portable communication terminal 20 is prevented from occurring during, for example, the communication operation of the antenna module 1.

The material forming the metallic plate 19 is not specifically limited as long as the material is conductive. For example, a stainless plate, a copper plate, or an aluminum plate may be used.

Each of the magnetic sheet 18 and the metallic plate 19 is preferably given a thickness such that when the magnetic sheet 18 and the metallic plate 19 are bonded to the antenna module 1, the overall thickness is prevented from being too large. For example, if the antenna module 1 is given a thickness of 300 µm, the magnetic sheet 18 may be given a thickness of 500 µm and the metallic plate 19 may be given a thickness of about 300 µm so that the overall thickness of the module is a little over 1 mm. Accordingly, the magnetic sheet 18, the metallic plate 19, and the antenna module 1 can be incorporated in the limited interior space of the terminal body 21 without adversely affecting the space-saving design of the antenna module 1.

The antenna module 1 is disposed inside the terminal body 21 in a manner such that the communication surface CS of the antenna module 1 faces outward. In this state, the external-terminal connecting portion 15 of the antenna module 1 is, for example, connected to an IC chip 24 provided for the antenna module 1.

The IC chip 24 stores ID and other types of data to be read in the process of communication with an external reader/writer 5 via the first antenna coil 11. Furthermore, the IC chip 24 also stores, for example, an access procedure (program) and key data required for reading and writing data stored in an external IC tag (IC card) 6 in the process of communication with the external IC tag 6 via the second antenna coil 12.

Referring to FIG. 7, when the portable communication terminal 20 according to the first embodiment is in communication with the external reader/writer 5, predetermined data stored in the IC chip 24 is transmitted via the first antenna coil 11 of the antenna module 1. Accordingly, the tag function of the portable communication terminal 20 can be used for paying, for example, train fares.

Furthermore, as shown in FIG. 8, when the portable communication terminal 20 is in communication with the external IC tag (IC card) 6, predetermined data stored in an IC chip 6A included in the IC tag 6 is read via the second antenna coil 12 of the antenna module 1. Accordingly, the reader/writer function of the portable communication terminal 20 can be used to check information, such as the outstanding balance in the IC tag 6, via the display portion 23.

When using the reader/writer function, the battery 25 in the portable communication terminal 20 may be used as the power source. In this case, the optimized design of the first and second antenna coils contributes to low power consumption of the portable communication terminal 20.

Furthermore, according to the first embodiment, the single antenna module contributes to a space-saving design required in the portable communication terminal 20. Moreover, the extra space obtained by such space-saving design can be utilized for preventing interference caused by, for example, undesired radiation, thereby contributing to an improvement in the quality of the portable communication terminal 20.

Second Embodiment

Figure 10:
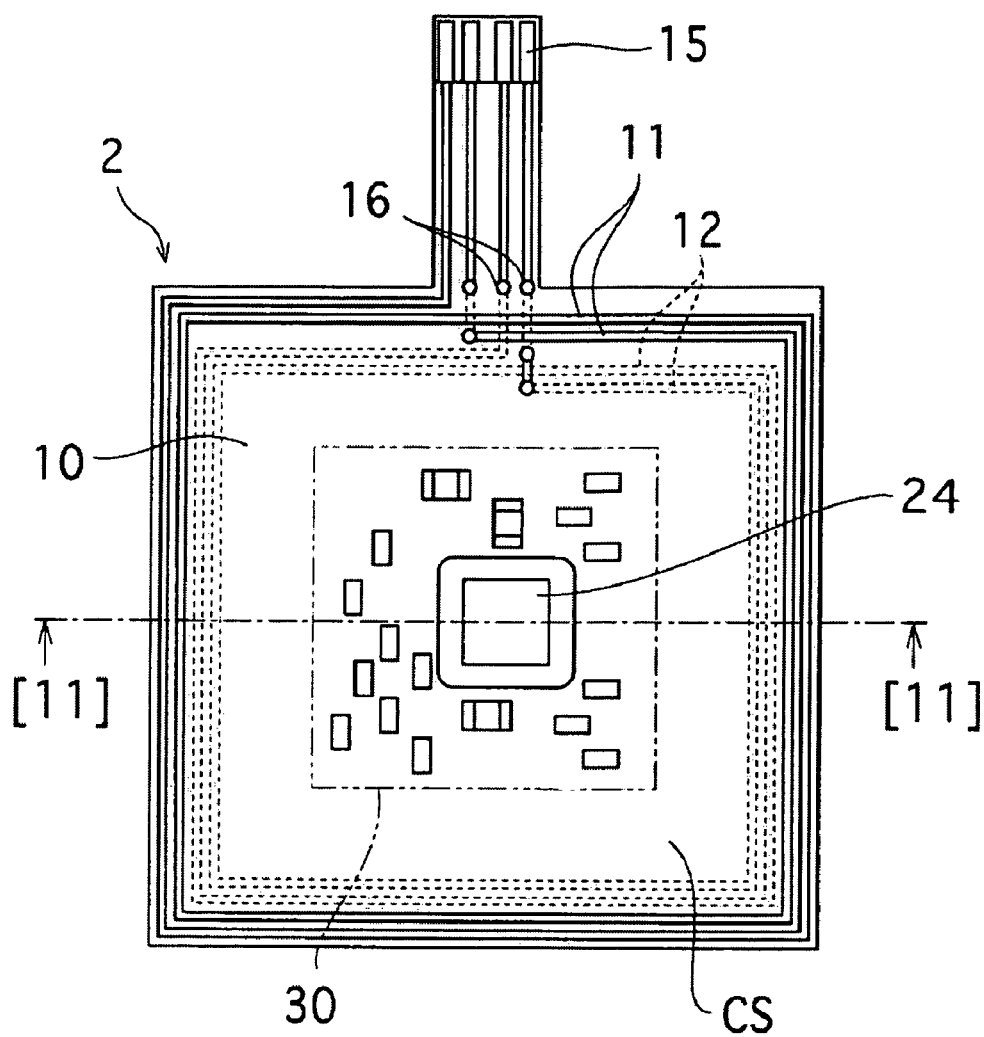
FIG. 10 is a plan view of an antenna module 2 according to a second embodiment of the present invention.
Figure 11:
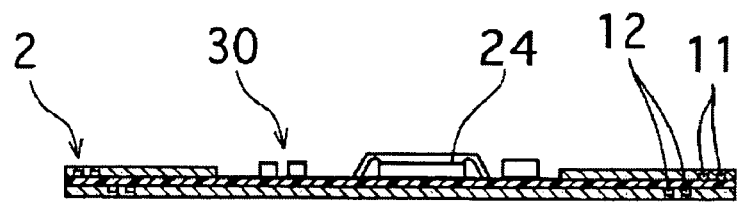
FIG. 11 is a cross-sectional view taken along line [11]-[11] in FIG. 10.

FIGS. 10 and 11 illustrate an antenna module 2 according to a second embodiment of the present invention. The components in the drawings that are equivalent to those in the first embodiment are indicated by the same reference numerals, and detailed descriptions of those components will therefore be omitted.

FIG. 10 is a plan view of the antenna module 2, and FIG. 11 is a cross-sectional view taken along line [11]-[11] in FIG. 10.

The antenna module 2 according to the second embodiment has the base substrate 10 on which the first antenna coil 11 for communication with a reader/writer, the second antenna coil 12 for communication with an IC tag, and an RFID circuit 30 are disposed. The RFID circuit 30 includes the IC chip 24 storing data to be transmitted via the first and second antenna coils.

The RFID circuit 30 corresponds to a "signal processing circuit" according to the present invention. In addition to the IC chip 24, the RFID circuit 30 includes a set of electronic components for, for example, generating and signal-processing input-output signals that are necessary for communication operation via the first and second antenna coils. In the drawings, a wiring pattern for electrically connecting the components is not shown.

In the example shown in the drawings, the RFID circuit 30 is disposed within the inner periphery of the second antenna coil 12. According to this configuration, the inner region (i.e. the air-core region) of the second antenna coil 12 can be utilized efficiently, thereby contributing to the size reduction of the antenna module 2.

Although the RFID circuit 30 is disposed on the side of the communication surface CS of the antenna module 2 (i.e. the top surface of the base substrate 10) in the example shown in the drawings, the RFID circuit 30 may alternatively be disposed on the main surface of the antenna module 2, which is opposite to the communication surface CS. Furthermore, if the RFID circuit cannot fit in the inner region of the second antenna coil 12, the RFID circuit may be provided on the side opposite to the side on which the second antenna coil 12 is disposed.

According to the antenna module 2, the RFID circuit 30 required for communication with a reader/writer or an IC tag and the first and second antenna coils 11, 12 are disposed together on the same base substrate 10 so as to define a substrate unit. This eliminates the need for providing a separate wiring substrate having an RFID circuit disposed thereon. Accordingly, an antenna module having an exceptionally good space-saving design is achieved.

Similar to the first embodiment, the antenna module 2 according to the second embodiment is disposed inside a portable communication terminal having a function for data communication via communication network. In this case, since the RFID circuit 30 is unitized on the antenna module 2, a large installation space is not required in the terminal body.

Furthermore, since the RFID circuit 30 is unitized on the antenna module 2, an integration, addition, or deletion of an RFID function with respect to the portable communication terminal is simplified, whereby the level of convenience in, for example, maintenance and after-sales service can be increased. Accordingly, the antenna module 2 can readily correspond to, for example, a model change of the terminal body, such that the antenna module 2 (IC chip 24) storing private information, such as usage history, can be used successively in the terminal of the new model. This increases the level of convenience as well as increasing the level of security.

As a similar purpose, the base substrate 10 may have a combined structure that includes a portion in which the antenna coils 11, 12 are disposed and a portion in which the RFID circuit 30 is disposed, such that different types of antenna coils 11, 12 may be connected to the RFID circuit 30.

Figure 15:
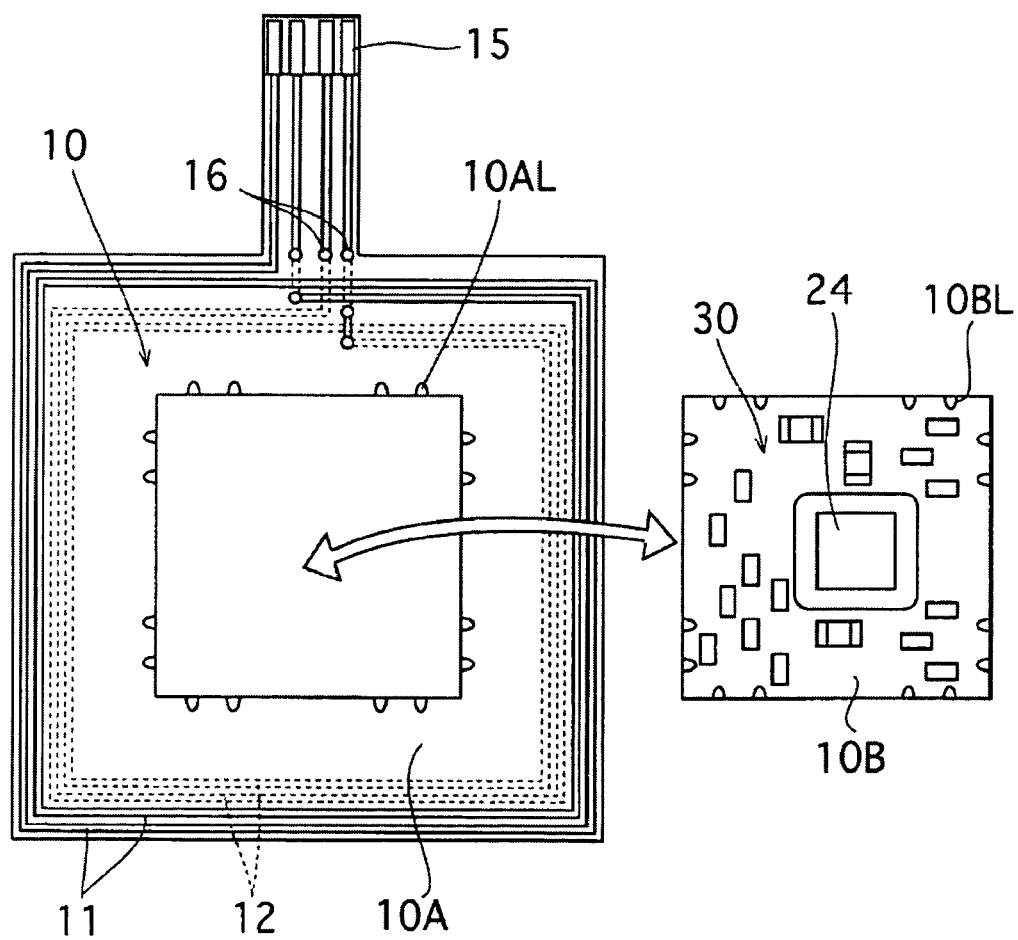
FIG. 15 is a plan view illustrating a modification example of the base substrate 10 of the antenna module 2.

For example, as shown in FIG. 15, the base substrate 10 may have a combination of an annular antenna holding substrate portion 10A for holding the first and second antenna coils 11, 12 and a circuit holding substrate portion 10B for holding the RFID circuit 30. The antenna holding substrate portion 10A and the circuit holding substrate portion 10B are electrically connected to each other via, for example, multiple sets of connector lands 10AL, 10BL that are aligned in the combined state. The lands 10AL, 10BL may be joined to each other by, for example, using a conductive jointing material, such as solder, or by wire-bonding.

In this case, the same circuit holding substrate portion 10B may be used consistently regardless of the antenna configuration. Moreover, the shape of the circuit holding substrate portion 10B, for example, is preferably common between modules.

Accordingly, while the RFID circuit 30 (IC chip 24) can be used successively, only the antenna coils 11, 12 may be changed to those of different specifications. Furthermore, by preparing multiple types of antenna holding substrate portions 10A in accordance with different specifications, a desired antenna module can be obtained simply by incorporating a common circuit holding substrate portion 10 into the antenna module. This contributes to better inventory management and higher productivity.

Similar to the first embodiment, when installing the antenna module 2 shown in FIG. 10 in a terminal body, a non-conductive magnetic sheet and a metallic plate are preferably disposed between the main surface of the antenna module 2, which is opposite to the communication surface CS, and the attachment portion of the terminal body. The advantages attained by providing the magnetic sheet and the metallic plate are the same as those described in the first embodiment. Therefore, the description of these advantages will be omitted.

Figure 12A:
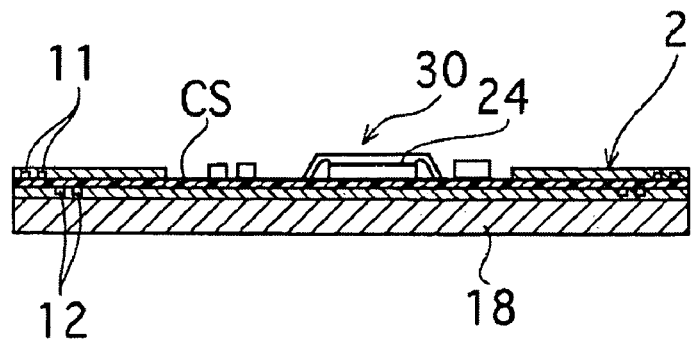
FIGS. 12A and 12B are cross-sectional views illustrating bonding examples of the magnetic sheet 18 with respect to the antenna module 2.
Figure 12B:
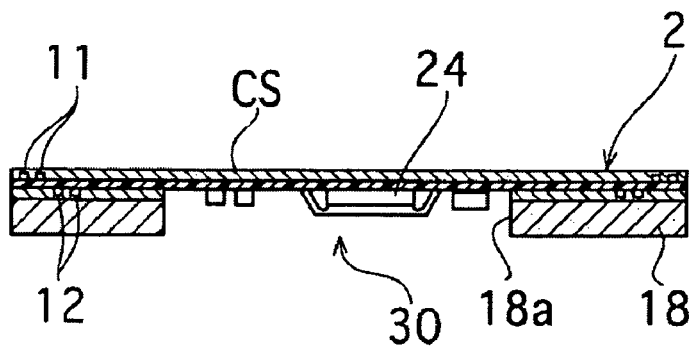

FIGS. 12A and 12B illustrate examples in which the magnetic sheet 18 is bonded to the main surface of the antenna module 2, which is opposite to the communication surface CS. FIG. 12A illustrates a bonding example of the magnetic sheet 18 in a case where the RFID circuit 30 is disposed on the communication surface CS of the antenna module 2.

On the other hand, FIG. 12B illustrates a bonding example of the magnetic sheet 18 in a case where the RFID circuit 30 is disposed on the main surface of the antenna module 2, which is opposite to the communication surface CS. In this example, the central portion of the magnetic sheet 18 is provided with an opening 18a having a sufficient dimension for holding the RFID circuit 30. Even though the opening 18a is provided in the central region of the module where the antenna coils are not disposed, the electromagnetic interference can still be sufficiently inhibited by the magnetic sheet 18. Since the RFID circuit 30 is held in the opening 18a, the overall thickness of the module is smaller in comparison to the structure shown in FIG. 12A, thereby further contributing to a space-saving design.

Figure 13A:
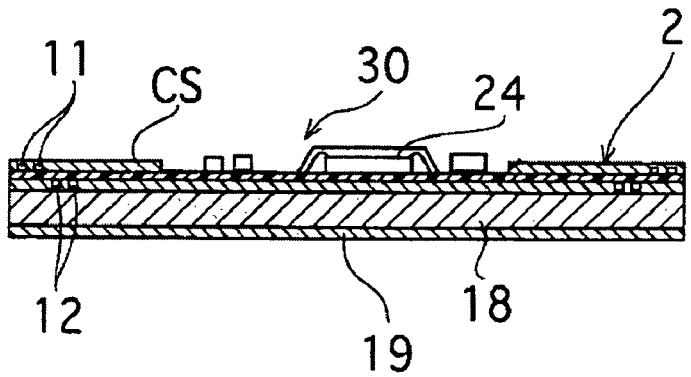
FIGS. 13A and 13B are cross-sectional views illustrating bonding examples of the magnetic sheet 18 and the metallic plate 19 with respect to the antenna module 2.
Figure 13B:
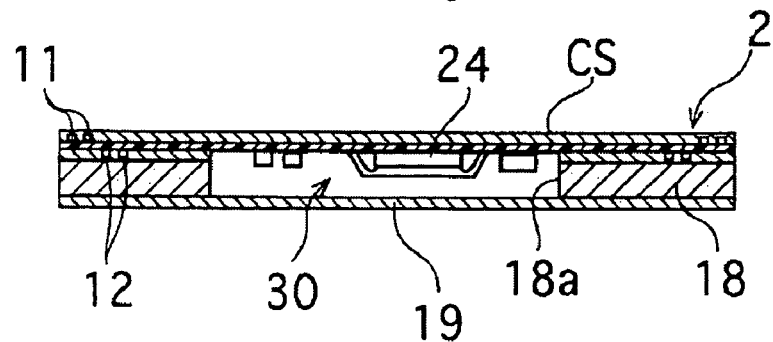

FIGS. 13A and 13B illustrate bonding examples of the metallic plate 19. FIG. 13A illustrates a bonding example of the metallic plate 19 in a case where the RFID circuit 30 is disposed on the communication surface CS of the antenna module 2. The metallic plate 19 is bonded to the antenna module 2 via the magnetic sheet 18.

On the other hand, FIG. 13B illustrates a bonding example of the metallic plate 19 in a case where the RFID circuit 30 is disposed on the main surface of the antenna module 2, which is opposite to the communication surface CS. In this example, the metallic plate 19 is bonded to the antenna module 2 via the magnetic sheet 18 whose central portion is provided with the opening 18a having a sufficient dimension for holding the RFID circuit 30. Since the RFID circuit 30 is held in the opening 18a of the magnetic sheet 18, the overall thickness of the module is smaller in comparison to the structure shown in FIG. 13A, thereby further contributing to a space-saving design.

Figure 14:
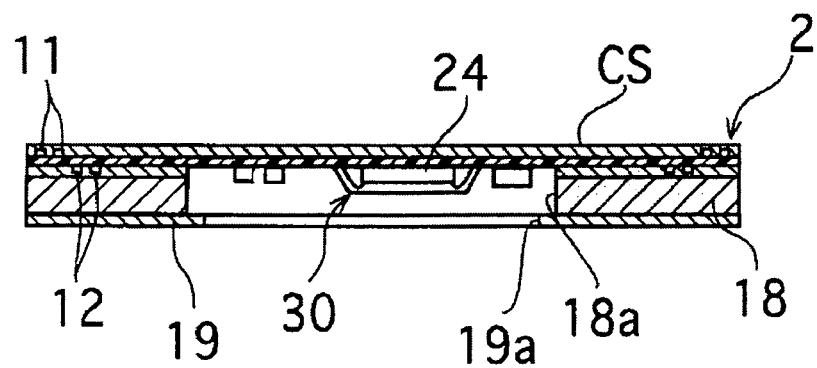
FIG. 14 is a cross-sectional view illustrating a modification example of the configuration shown in FIG. 13B.

Referring to FIG. 14, the central portion of the metallic plate 19 may also be provided with an opening 19a facing the RFID circuit 30. This may allow greater flexibility in the installation space for components included in the RFID circuit 30, thereby allowing installation of components with relatively large heights.

Figure 16:
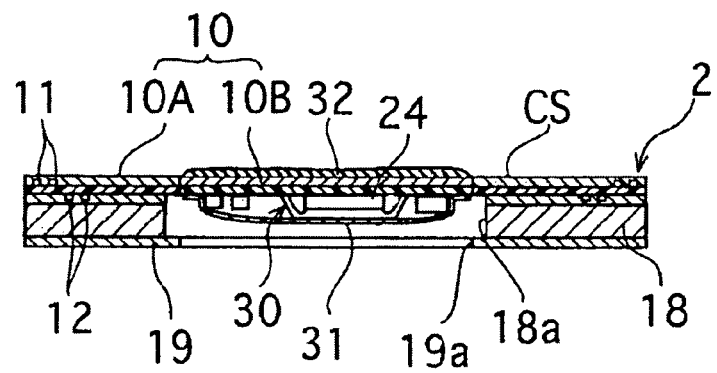
FIG. 16 is a cross-sectional view illustrating another modification example of the configuration shown in FIG. 13B.
Figure 17:
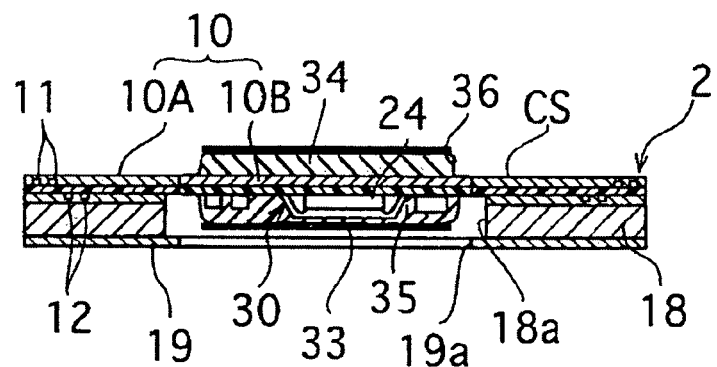
FIG. 17 is a cross-sectional view illustrating another modification example of the configuration shown in FIG. 13B.
Figure 18:
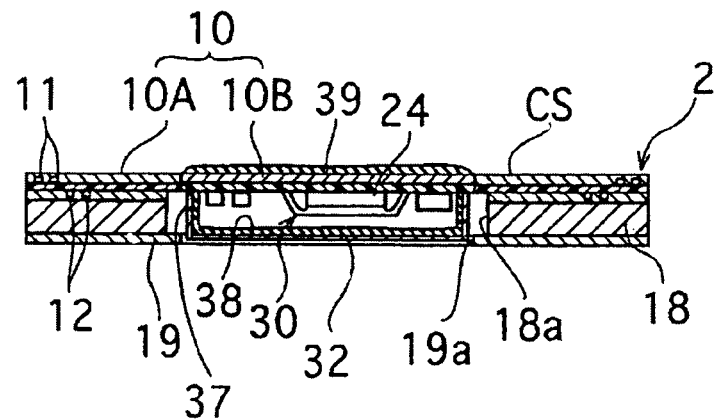
FIG. 18 is a cross-sectional view illustrating another modification example of the configuration shown in FIG. 13B.

On the other hand, if the opening 19a in the metallic plate 19 could possibly induce an electromagnetic effect between the RFID circuit 30 and the terminal body, the base substrate 10 of the antenna module 2 is preferably provided with wave absorbers that cover the RFID circuit 30, as shown in FIGS. 16 to 18.

FIG. 16 illustrates an example in which the entire region of the RFID circuit 30 is covered with a flexible sheet-like wave absorber 31. The wave absorber 31 is composed of a soft magnetic material which is selected based on a frequency band of a noise wave released from the RFID circuit 30. Moreover, where necessary, the top surface of the base substrate 10 (i.e. the surface on which the circuit is not disposed) may also be provided with a similar wave absorber 32 in order to reduce undesired radiation towards the top surface of the base substrate 10. Furthermore, by additionally providing a metallic layer over the outer surface of each of the wave absorbers 31, 32, noise prevention can further be enhanced.

On the other hand, FIG. 17 illustrates an example in which the RFID circuit 30 is sandwiched between a pair of metallic plates 35, 36 via wave absorbers 33, 34 from opposite sides of the base substrate 10. In this case, the wave absorbers 33, 34 may be composed of a compound-like material, and may be formed integrally with the base substrate 10 so as to cover the RFID circuit 30. Alternatively, the wave absorbers 33, 34 may be composed of a paste-like material. In that case, the paste-like material is applied over the RFID circuit 30, and is subsequently cured. In addition to enhancing noise prevention, the metallic plates 35, 36 also function as reinforcement plates for protecting the RFID circuit 30 from external stress.

FIG. 18 illustrates an alternative example for the countermeasure against undesired radiation from the RFID circuit 30 and for protecting the RFID circuit 30 from external stress. In this example, the RFID circuit 30 is covered with a substantially box-shaped metallic cover 37 having a predetermined strength. Moreover, a sheet-like wave absorber 38 is bonded to the inner surface of the cover 37. Alternatively, the whole interior space of the cover 37 may be packed with a wave absorber. Furthermore, where necessary, a region on the top surface of the base substrate 10 that corresponds to the region in which the RFID circuit 30 is disposed may also be provided with a wave absorber 39. Moreover, a metallic layer may be disposed over the wave absorber 39. This metallic layer may be foil-like if the metallic layer is used as a countermeasure against noise. On the other hand, if the metallic layer is intended for increasing the strength, a specific thickness is required.

The expression "a wave absorber covering the signal processing circuit" in the claims implies that a wave absorber is provided in one of or each of a circuit-occupying region on the circuit holding surface of the base substrate 10 and a circuit-occupying region on the surface opposite thereto.

The countermeasure against undesired radiation from the RFID circuit 30 (and the countermeasure for the protection of the RFID circuit 30 from external stress) are applicable not only to the antenna module 2 to which the metallic plate 19 is bonded, but also to, for example, the example shown in FIG. 12B. Although this example is directed to the antenna module 2 provided with only the magnetic sheet 18, such countermeasures are applicable to, for example, a case where the metallic plate 19 or a component equivalent thereto is preliminarily attached to the attachment portion of the terminal body. In that case, if a terminal body is not given prevention means against electromagnetic interference with the RFID circuit 30, such prevention means can be achieved by installing the wave absorbers described above.

The wave absorbers covering the RFID circuit 30 have different purposes from the magnetic sheet 18 attached directly below the first and second antenna coils 11, 12 of the antenna module 2. In other words, the wave absorbers are provided for absorbing noise components released from the RFID circuit 30, and therefore contain selected magnetic powder that can efficiently absorb a noise band. In contrast, the main purpose of the magnetic sheet 18 is to provide desired communication performance for the antenna module 2. Therefore, the magnetic sheet 18 contains selected magnetic powder that provides optimal communication performance (for example, magnetic permeability) with respect to, for example, the inductance or communication frequency of the antenna coils.

In the examples shown in FIGS. 16 to 18, the base substrate 10 is a combination of the antenna holding substrate portion 10A and the circuit holding substrate portion 10B (see FIG. 15). Alternatively, these examples are similarly applicable to the base substrate 10 shown in FIG. 10, which is an integrated substrate.

The technical scope of the present invention is not limited to the above embodiments, and modifications are permissible within the scope and spirit of the present invention.

For example, in the above-described embodiments, although the antenna module according to the present invention is applied to a portable communication terminal, such as a mobile phone and a PDA, the application of the present invention is not limited to a portable communication terminal. For example, the present invention is also applicable to, for example, a portable game device or a dedicated portable RFID communication device.

Furthermore, the IC tag storing data to be read by the second antenna coil of the antenna module according to the present invention is not limited to the IC card mentioned above. The present invention is applicable to IC tags of other types, such as a coin-type and a stick-type.

Furthermore, as an alternative to the above-described embodiments in which the first and second antenna coils of the antenna module are disposed on a single, common base substrate, the base substrate according to the present invention may be defined by a laminate including a first film substrate component having the first antenna coil and a second film substrate component having the second antenna coil.

INDUSTRIAL APPLICABILITY

As described above, in the antenna module according to the present invention, a first antenna coil for communication with a reader/writer and a second antenna coil for communication with an IC tag are disposed on a common base substrate. Thus, a space-saving antenna module having both a long communication distance required for a tag function and a wide communication range required for a reader/writer function is achieved.

Furthermore, the portable communication terminal according to the present invention is provided with both a tag function and a reader/writer function without having a large-size terminal body.

The invention claimed is:
1. An antenna module comprising:
a substrate having a communication surface opposite a main surface;
a first antenna coil disposed on the communication surface of the substrate and configured to communicate with a reader/writer;

a second antenna coil disposed on the main surface of the substrate inside the first antenna coil and configured to communicate with an IC tag;
a magnetic sheet bonded to the main surface of the substrate and the second antenna coil; and
a metallic plate bonded to the main surface of the substrate via the magnetic sheet,
wherein,
the first antenna coil and second antenna coil are separated by a distance which prevents magnetic coupling of the two antenna coils,
the first antenna is configured to communicate over a wider range of frequencies than the second antenna, and
the second antenna is configured to communicate over a longer distance than the first antenna, and
the second antenna coil is disposed between the magnetic sheet and the main surface of the substrate.

2. The antenna module according to claim 1, wherein the first and second antenna coils are disposed within a plane of the substrate, and one of the antenna coils is disposed within an inner periphery of the other antenna coil.

3. The antenna module according to claim 1, where a plurality of one or each of the first antenna coil and the second antenna coil are disposed on the substrate.

4. An antenna module comprising:
a substrate having a communication surface opposite a main surface;
a first antenna coil disposed on the communication surface of the substrate and is configured to communicate with a reader/writer;
a second antenna coil disposed on the main surface of the substrate and is configured to communicate with an IC tag;
a magnetic sheet bonded to the main surface of the substrate and the second antenna coil;
a metallic plate bonded to the main surface of the substrate via the magnetic sheet; and
a signal processing circuit disposed on the main surface of the substrate and including an IC storage medium storing data to be transmitted via the first and second antenna coils,
wherein,
the first antenna coil and second antenna coil are separated by a distance which prevents magnetic coupling between them,
the first antenna is configured to communicate over a wider range of frequencies than the second antenna, and
the second antenna is configured to communicate over a longer distance than the first antenna, and
the second antenna coil is disposed between the magnetic sheet and the main surface of the substrate.

5. The antenna module according to claim 4, wherein the substrate is provided with a wave absorber covering the signal processing circuit.

6. The antenna module according to claim 5, wherein a surface of the wave absorber is provided with a metallic layer.

7. The antenna module according to claim 4, wherein:
one of antenna coils is disposed within an inner periphery of the other antenna coil, and
the signal processing circuit is disposed within the inner periphery of said other antenna coil.

8. The antenna module according to claim 7, wherein the substrate includes a combination of an annular antenna holding substrate portion for holding the first and second antenna coils and a circuit holding substrate portion for holding the signal processing circuit.

9. The antenna module according to claim 8, wherein the substrate is provided with a wave absorber covering the signal processing circuit.

10. The antenna module according to claim 9, wherein a surface of the wave absorber is provided with a metallic layer.

11. The antenna module according to claim 4, wherein the magnetic sheet is provided with an opening in which the signal processing circuit on the substrate is held.

12. The antenna module according to claim 11, wherein the substrate is provided with a wave absorber covering the signal processing circuit.

13. The antenna module according to claim 12, wherein a surface of the wave absorber is provided with a metallic layer.

14. The antenna module according to claim 4, wherein a plurality of one or each of the first antenna coil and the second antenna coil are disposed on the substrate.

15. A portable communication terminal having a function for data communication via a communication network, comprising:
an antenna module including a substrate with a communication surface opposite a main surface, a first antenna coil on the communication surface configured to communicate with a reader/writer and a second antenna coil on the main surface configured to communicate with an IC tag; and
an IC storage medium which stores data transmitted via the first and second antenna coils,
wherein,
the first antenna coil and second antenna coil are separated by a distance which prevents magnetic coupling between them,
the first antenna is configured to communicate over a wider range of frequencies than the second antenna, and
the second antenna is configured to communicate over a longer distance than the first antenna,
a metallic plate is bonded to the main surface of the substrate via a magnetic sheet; and
the second antenna coil is disposed between the magnetic sheet and the main surface of the substrate.

16. The portable communication terminal according to claim 15, wherein the first and second antenna coils are disposed within a plane of the substrate, and one of antenna coils is disposed within an inner periphery of the other antenna coil.

17. The portable communication terminal according to claim 15, wherein a central portion of the substrate is provided with a signal processing circuit including the IC storage medium.

* * * * *